(12) United States Patent
Kim

(10) Patent No.: US 8,330,777 B2
(45) Date of Patent: Dec. 11, 2012

(54) INFORMATION PROCESSING METHOD, TOUCH INFORMATION PROCESSING DEVICE, AND FLAT PANEL DISPLAY

(75) Inventor: Jinkyu Kim, Dajeon (KR)

(73) Assignee: LG Display Co. Ltd., Seoul (KR)

( * ) Notice: Subject to any disclaimer, the term of this patent is extended or adjusted under 35 U.S.C. 154(b) by 587 days.

(21) Appl. No.: 12/558,014

(22) Filed: Sep. 11, 2009

(65) Prior Publication Data

US 2010/0214236 A1    Aug. 26, 2010

(30) Foreign Application Priority Data

Feb. 20, 2009    (KR) .................. 10-2009-0014203

(51) Int. Cl.
*G09G 5/10*    (2006.01)
(52) U.S. Cl. .................. 345/690; 345/173; 345/692
(58) Field of Classification Search .................. None
See application file for complete search history.

(56) References Cited

U.S. PATENT DOCUMENTS

| | | | | |
|---|---|---|---|---|
| 5,870,503 A * | 2/1999 | Kumashiro | .................. | 382/252 |
| 6,091,389 A * | 7/2000 | Maeda et al. | .................. | 345/98 |
| 6,118,547 A * | 9/2000 | Tanioka | .................. | 358/1.9 |
| 6,133,902 A * | 10/2000 | Ohkubo et al. | .................. | 345/690 |
| 6,175,657 B1 * | 1/2001 | Mancuso et al. | .................. | 382/261 |
| 6,608,941 B1 * | 8/2003 | Suzuki et al. | .................. | 382/272 |
| 6,879,717 B2 * | 4/2005 | Aggarwal et al. | .................. | 382/167 |
| 7,209,151 B2 * | 4/2007 | Huang | .................. | 345/690 |
| 7,312,774 B1 * | 12/2007 | Yoshihara et al. | .................. | 345/87 |
| 7,386,181 B2 * | 6/2008 | Murakami | .................. | 382/251 |
| 7,405,845 B2 * | 7/2008 | Ishikawa | .................. | 358/1.9 |
| 7,463,788 B2 * | 12/2008 | Kameyama | .................. | 382/284 |
| 7,630,520 B2 * | 12/2009 | Visan et al. | .................. | 382/112 |
| 8,041,139 B2 * | 10/2011 | Ma | .................. | 382/254 |
| 2006/0152443 A1 * | 7/2006 | Song et al. | .................. | 345/63 |
| 2006/0170658 A1 * | 8/2006 | Nakamura et al. | .................. | 345/173 |
| 2007/0201756 A1 * | 8/2007 | Murakami | .................. | 382/251 |

* cited by examiner

*Primary Examiner* — Dismery Mercedes
(74) *Attorney, Agent, or Firm* — Brinks Hofer Gilson & Lione

(57) ABSTRACT

A method and a device for processing touch information and a flat panel display using the method and the device are disclosed. The touch information processing arrangement includes: generating sensor output data from a touch sensor array; computing the sensor output data corresponding to each of adjacent frames to generate difference data; first binarizing the difference data based on a predetermined first threshold value; filtering the first binarized difference data; and second binarizing the filtered difference data based on a predetermined second threshold value.

12 Claims, 11 Drawing Sheets

INFORMATION PROCESSING METHOD, TOUCH INFORMATION PROCESSING DEVICE, AND FLAT PANEL DISPLAY

This application claims the benefit of Korea Patent Application No. 10-2009-0014203 filed on Feb. 20, 2009, the entire contents of which is incorporated herein by reference for all purposes as if fully set forth herein.

BACKGROUND

1. Field of the Invention

Embodiments of the disclosure relate to a method and a device for processing touch information, and more particularly, to a method and a device for processing touch information capable of effectively removing a high frequency noise included in touch sensor data and a flat panel display using the method and the device.

2. Discussion of the Related Art

Examples of a flat panel display include a liquid crystal display (LCD), a plasma display panel (PDP), a field emission display (FED), and an organic light emitting diode (OLED) display. Most of them have been put to practical use in electric home appliances or personal digital appliances and have been put on the market.

With a recent trend toward a thin profile and lightness in weight of electric home appliances or personal digital appliances, a button switch as the user's input means has been substituted for a touch sensor. Examples of the touch sensor include a capacitive touch sensor, a resistance touch sensor, a pressure touch sensor, an optical touch sensor, and an ultrasonic touch sensor, etc. One kind of an optical touch sensor that has been widely used is an in-cell touch panel type touch sensor in which touch sensors are formed inside a pixel of a display device.

The in-cell touch panel type touch sensor, as shown in FIG. 1, includes a sensor thin film transistor (TFT) differently generating a light current "i" depending on a touch or non-touch operation, a sensor capacitor Cst storing charges resulting from the light current "i", and a switch TFT outputting the charges stored in the sensor capacitor Cst. In the in-cell touch panel type touch sensor, light sensing data generated in the touch operation is different from light sensing data generated in the non-touch operation. A flat panel display can detect information about a touch position of a user's finger or a touch pen based on the light sensing data of the in-cell touch panel type touch sensor.

The optical touch sensor has a problem that the light sensing data is greatly affected by an external illuminance or a shadow. To solve the problem, an optical black method and a reference image difference method have been proposed. However, the optical black method cannot remove a specific deviation of a display panel, and the reference image difference method recognizes an image on a display screen or an image reflected by a polarizing plate as a basic receiving light pattern. Accordingly, a frame difference method has been recently proposed to solve the problem.

In the frame difference method, light sensing frame data input in a previous frame is subtracted from light sensing frame data input in a current frame to generate new difference data. Then, a meaning touch boundary portion is calculated using a determined threshold value as a parameter. In the frame difference method, a noise component included commonly in the light sensing frame data is removed in the same manner as a differential amplifier. The frame difference method, as shown in FIG. 2, employs the fact that when a user touches a display screen with his or her finger, his/her finger inevitably moves slightly on XY-plane. In the frame difference method, a charge amount of a movement of his/her finger indicated by a notch portion can be detected based on the fact.

However, in the case of using the related art frame difference method, in theory, a noise existing between adjacent frames has to be completely removed. However, as can be readily seen from FIGS. 3 and 4, a high frequency noise that is not perceived by his or her eye is scattered in several positions. FIGS. 3 and 4 illustrate binary images for detecting a high frequency noise that is not perceived by his or her eye. More specifically, in the binary image shown in FIG. 3, a portion in which a value of difference data between two adjacent frames is equal to or greater than "1" (minimum data unit) is indicated in a black, and a portion in which a value of difference data between two adjacent frames is zero is indicated in a white. In the binary image shown in FIG. 4, a portion in which a value of difference data between two adjacent frames is equal to or greater than "2", "3", ..., "9" respectively is indicated in a black, and a portion in which a value of difference data between two adjacent frames is less than "2", "3", ..., "9" respectively is indicated in a white.

The related art frame difference method uses an uppermost portion of a finger boundary portion as touch coordinates using the determined threshold value. However, it is difficult to distinguish the finger boundary portion from the high frequency noise. Therefore, a portion that is not touched with his/her finger may be detected as touch coordinates. Further, the high frequency noise may be removed using a touch sensor integrate circuit (IC) including the differential amplifier through a physical or hardware method, but a large number of transistors are necessary. As a result, the manufacturing cost, the size, and the weight of the flat panel display increase.

BRIEF SUMMARY

In one aspect, a touch information processing method comprised generating sensor output data from a touch sensor array including a plurality of touch sensors, individually storing the sensor output data corresponding to each frame and computing the sensor output data corresponding to each of adjacent frames to generate difference data, first binarizing the difference data based on a predetermined first threshold value to generate the difference data corresponding to a black gray level and the difference data corresponding to a white gray level, filtering the first binarized difference data to vary a gray level of the difference data corresponding to the black gray level depending on a black density around the difference data corresponding to the black gray level, and second binarizing the filtered difference data based on a predetermined second threshold value to generate the difference data corresponding to the black gray level and the difference data corresponding to the white gray level.

In another aspect, a touch information processing device comprisrd a touch sensor array including a plurality of touch sensors, a frame difference unit that obtains sensor output data corresponding to each frame from the touch sensor array and computes the sensor output data corresponding to each of adjacent frames to generate difference data, a first binary unit that first binarizes the difference data based on a predetermined first threshold value to generate the difference data corresponding to a black gray level and the difference data corresponding to a white gray level, a filtering unit that filters the first binarized difference data to vary a gray level of the difference data corresponding to the black gray level depending on a black density around the difference data corresponding to the black gray level, and a second binary unit that second binarizes the filtered difference data based on a predetermined second threshold value to generate the difference data corresponding to the black gray level and the difference data corresponding to the white gray level.

In another aspect, a flat panel display comprising a display device includes a display panel, a data drive circuit driving data lines of the display panel, a scan drive circuit driving gate lines of the display panel, and a timing controller controlling operation timing of each of the data drive circuit and the scan drive circuit, and a touch information processing device, wherein the touch information processing device includes a touch sensor array including a plurality of touch sensors, a frame difference unit that obtains sensor output data corresponding to each frame from the touch sensor array and computes the sensor output data corresponding to each of adjacent frames to generate difference data, a first binary unit that first binarizes the difference data based on a predetermined first threshold value to generate the difference data corresponding to a black gray level and the difference data corresponding to a white gray level, a filtering unit that filters the first binarized difference data to vary a gray level of the difference data corresponding to the black gray level depending on a black density around the difference data corresponding to the black gray level, and a second binary unit that second binarizes the filtered difference data based on a predetermined second threshold value to generate the difference data corresponding to the black gray level and the difference data corresponding to the white gray level.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Figure 1:
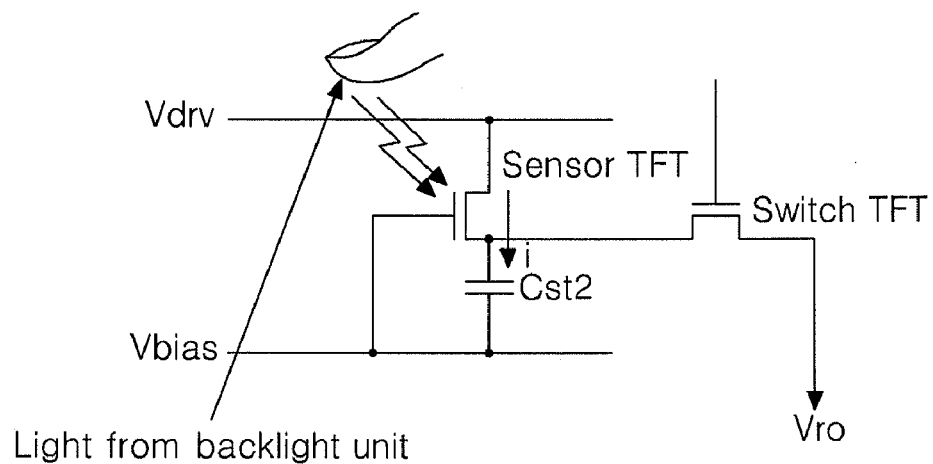
FIG. 1 is an equivalent circuit diagram of a touch sensor formed inside a pixel.
Figure 2:
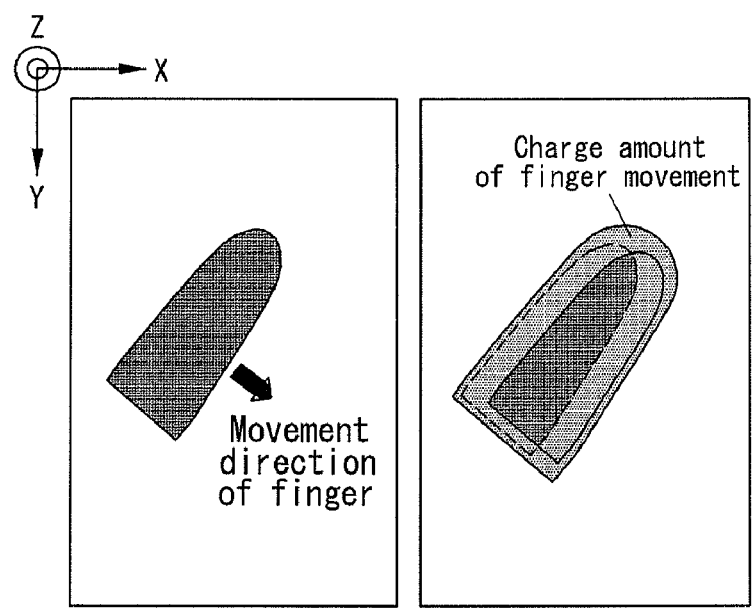
FIG. 2 is a diagram for explaining a principle of a frame difference method.
Figure 3:
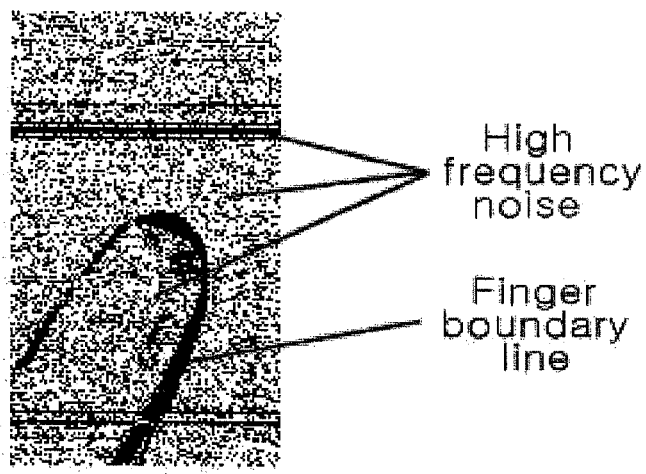
FIGS. 3 and 4 illustrate binary images for detecting a high frequency noise that is not perceived by his or her eye.
Figure 4:
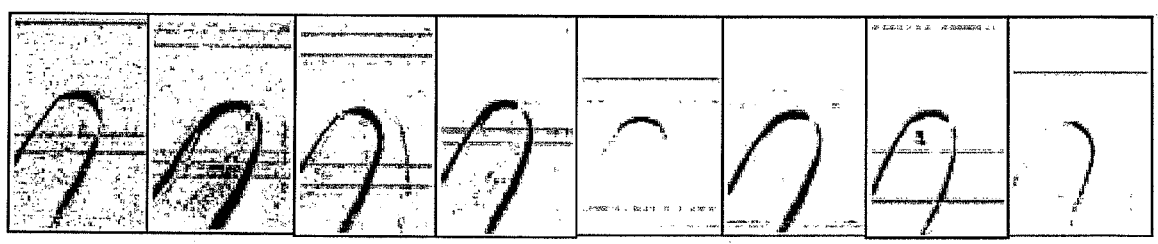
Figure 5:
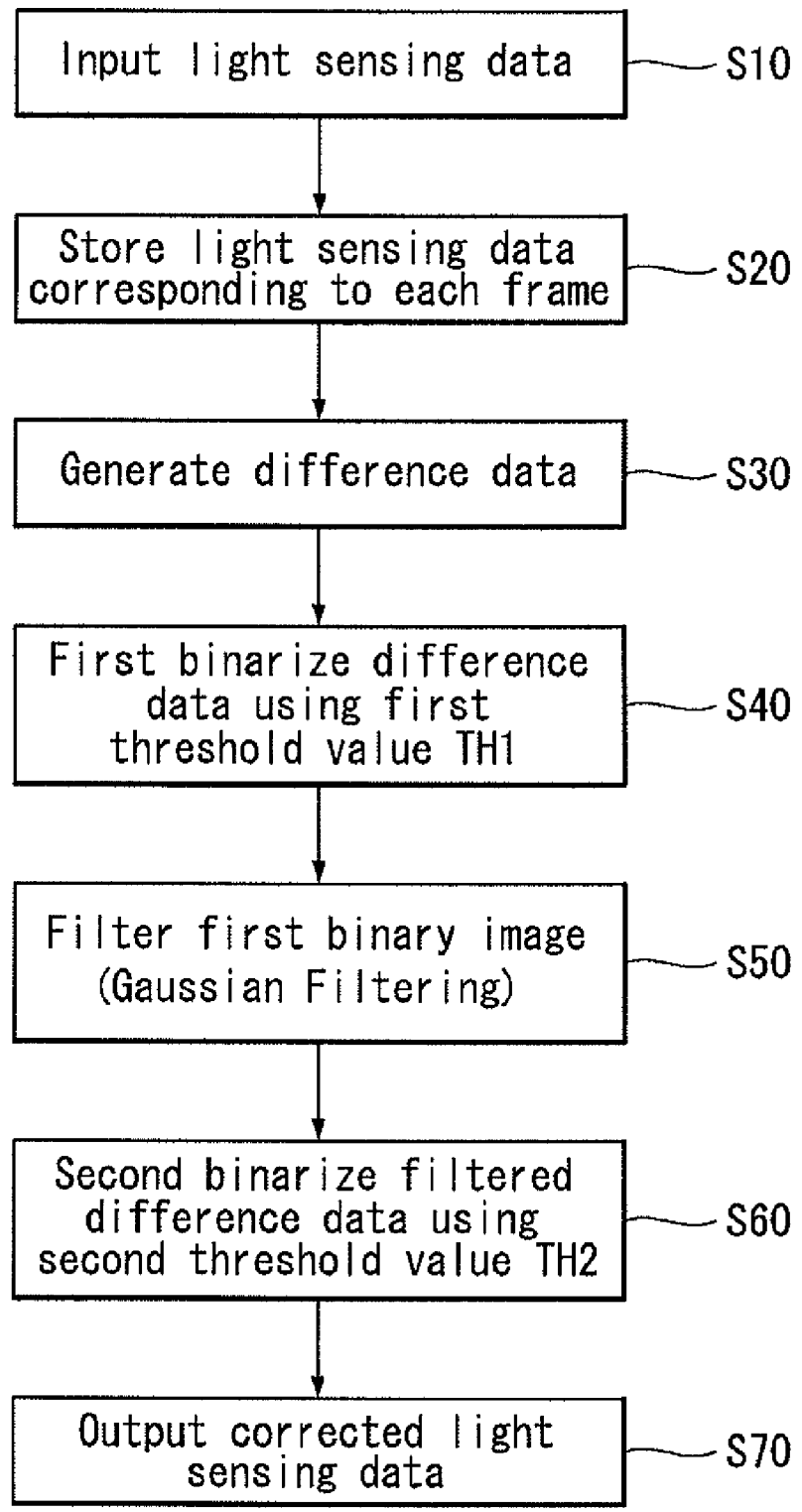
FIG. 5 is a flow chart illustrating a touch information processing method according to an embodiment of the disclosure.
Figure 6:
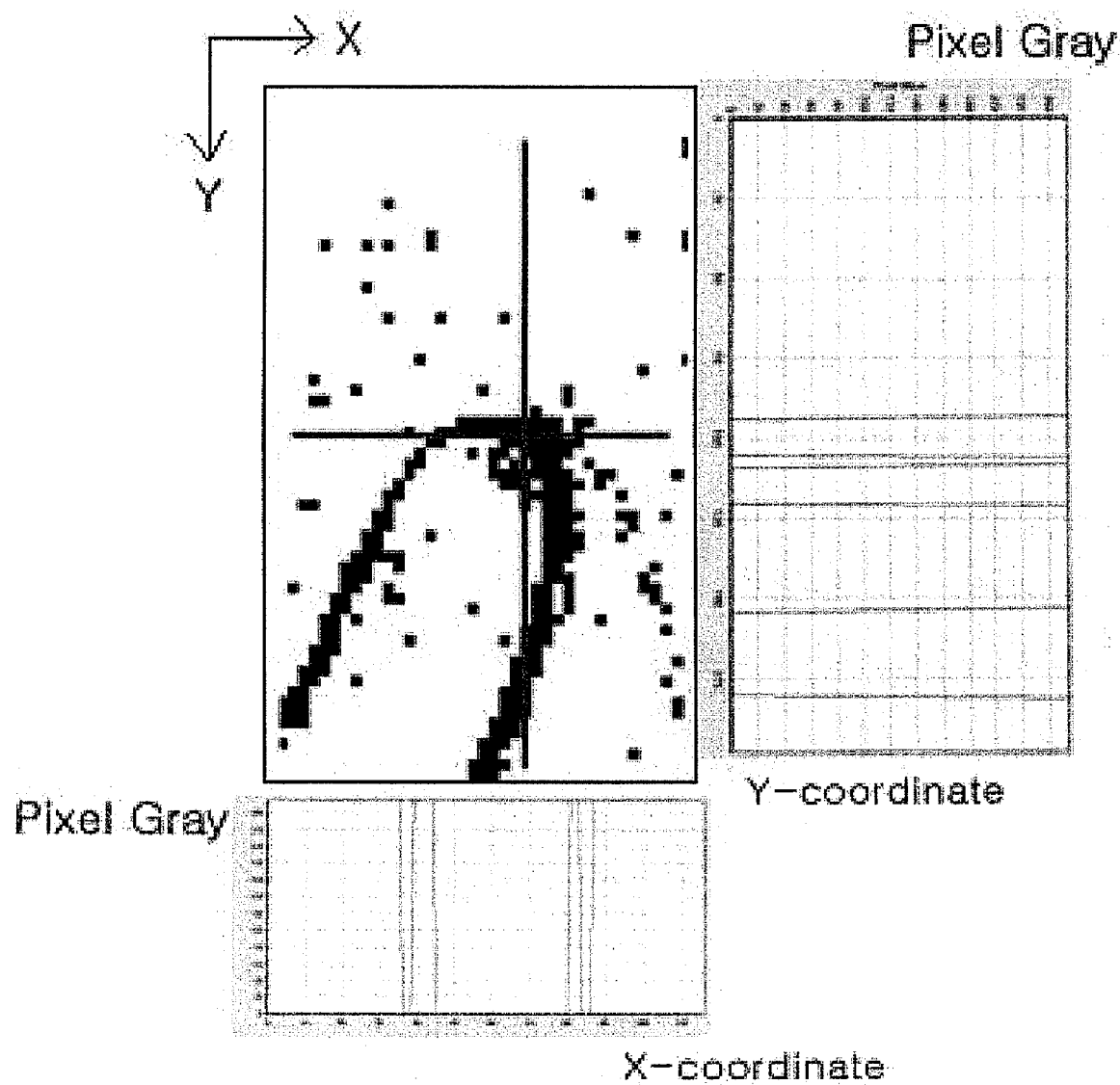
FIG. 6 illustrates a first binary image of difference data.
Figure 7:
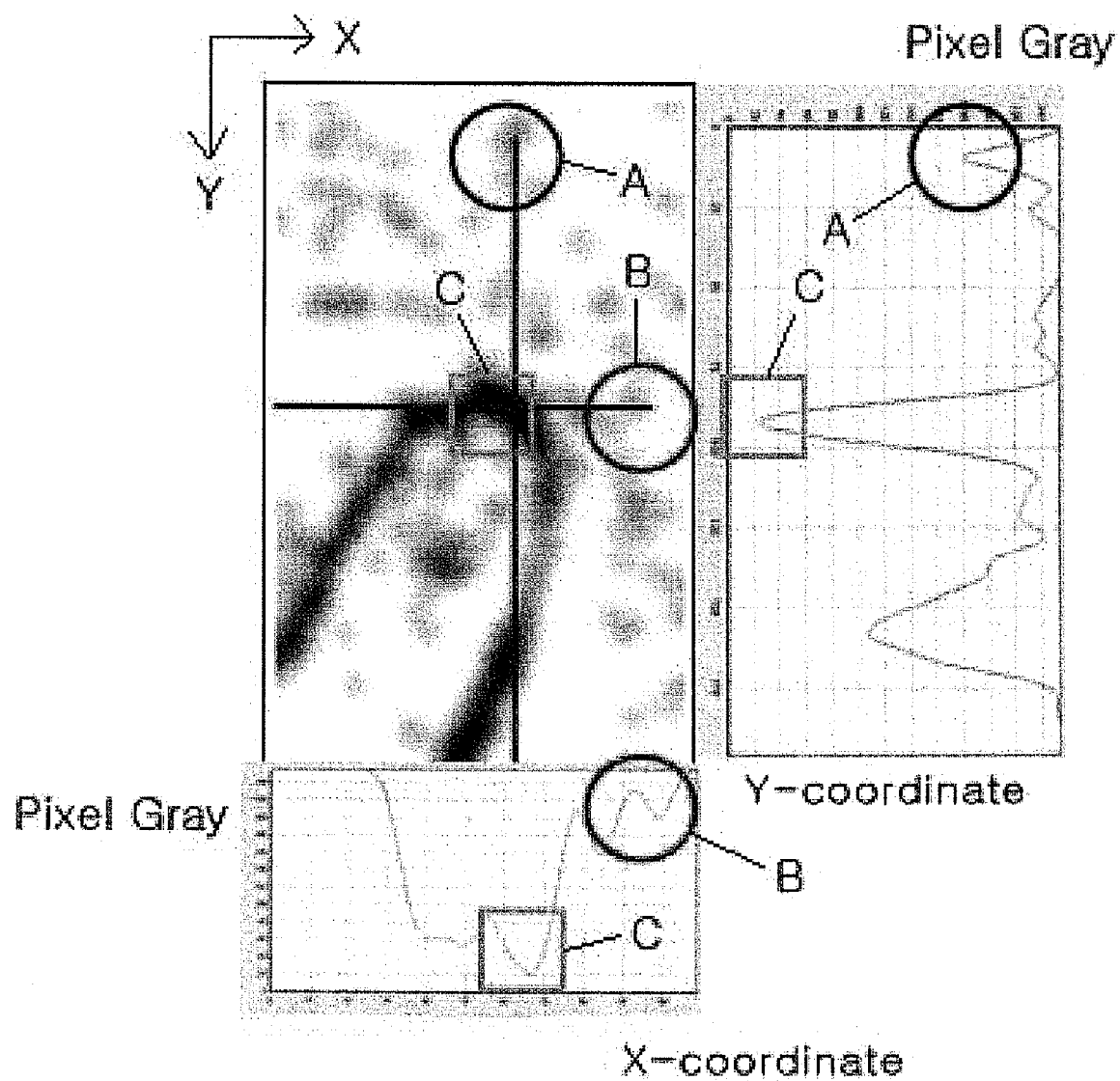
FIG. 7 illustrates an image obtained by filtering a first binary image and reflecting a spatial frequency on the first binary image.
Figure 8:
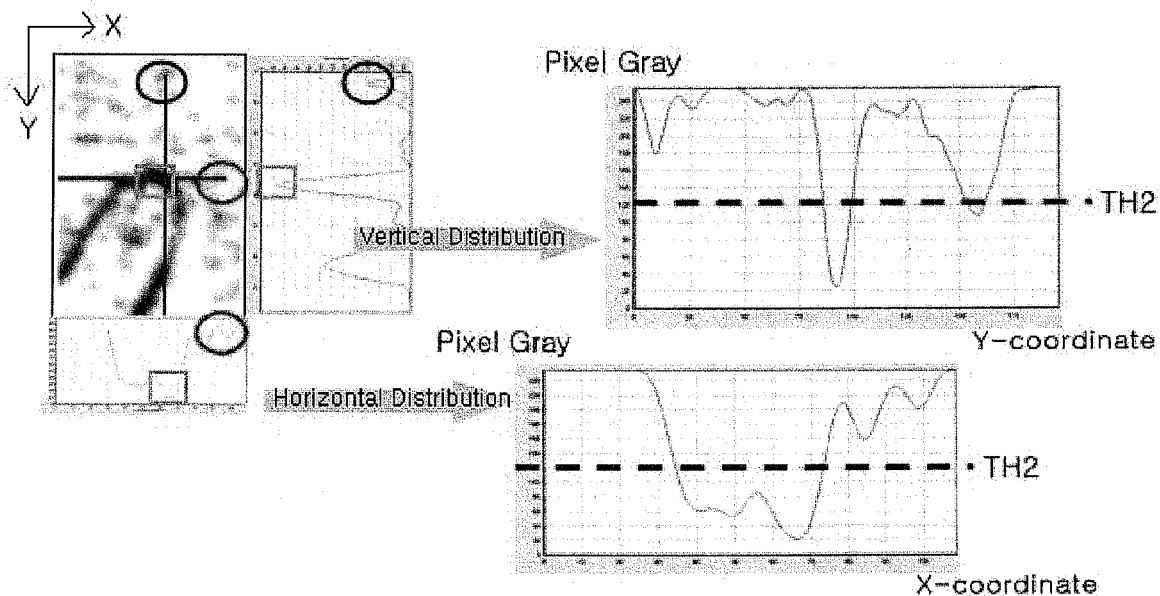
FIG. 8 illustrates a second threshold value for second binarizing an image on which a spatial frequency is reflected.
Figure 9:
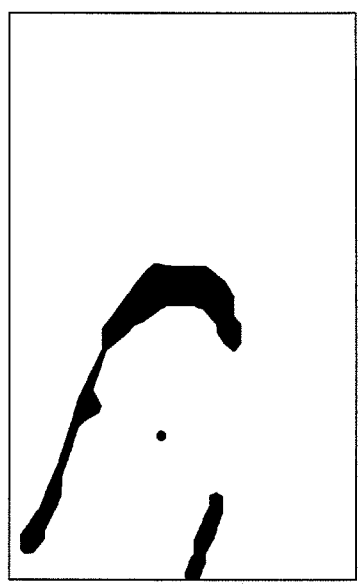
FIG. 9 illustrates a second binary image of difference data using a second threshold value.

FIG. 5 is a flow chart illustrating a touch information processing method according to an embodiment. FIG. 6 illustrates a first binary image of difference data. FIG. 7 illustrates an image obtained by filtering a first binary image and reflecting a spatial frequency on the first binary image. FIG. 8 illustrates a second threshold value for second binarizing an image on which a spatial frequency is reflected. FIG. 9 illustrates a second binary image of the difference data using a second threshold value. In FIGS. 6 to 8, the Y-axis indicates a gray level of each of difference data, and the X-axis indicates X-coordinate value or Y-coordinate value of the difference data on XY-plane.

As shown in FIGS. 5 to 9, in a touch information processing method according to an embodiment of the invention, if light sensing data generated in a touch sensor is input in step S10, the light sensing data corresponding to each frame is individually stored in step S20.

Subsequently, light sensing frame data input in a previous frame (for example, an (N−1)-th frame) is subtracted from light sensing frame data input in a current frame (for example, an N-th frame) using a frame difference method to generate new difference data in step S30.

Subsequently, as shown in FIG. 6, the new difference data is first binarized using a predetermined first threshold value TH1 as a parameter in step S40. In a first binary image shown in FIG. 6, a value of the difference data in a black portion is greater than the first threshold value TH1, and a value of the difference data in a white portion is less than the first threshold value TH1. The black portion includes a high frequency noise as well as a touch boundary line to finally obtain. First binary processing is to simply represent k-bit difference data (where k is a natural number) having gray values of 0 to $2^k$ as binary-coded digit "0" or "1", that is represented as a black gray level (i.e., gray value 0 or binary-coded digit "0") or a peak white gray level (i.e., gray value $2^k$ or binary-coded digit "1"). Hence, an efficiency of a subsequent filtering operation can increase through the first binary processing.

Subsequently, a filtering operation is performed on the first binary image in horizontal and vertical directions (i.e., transverse and longitudinal directions) using Gaussian kernel expressed by the following Equation 1 in step S50.

$$K = \frac{1}{\sqrt{2\pi}\sigma} \exp\left(-\frac{x^2}{2\sigma^2}\right) \quad \text{[Equation 1]}$$

According to an experiment, an excellent filtering effect can be obtained when "σ" in the above Equation 1 has a value of 2.5 to 3.0. A reason to filter the first binary image using Gaussian kernel is to reflect a spatial frequency generated in the filtering operation to the first binarized difference data. In other words, as shown in FIG. 7, gray levels of black points constituting the touch boundary line can be distinguished from gray levels of black points constituting the high frequency noise by reflecting a spatial distribution of the black points at each position data of a frame. In FIG. 7, data in areas "A" and "B" corresponds to the high frequency noise and is scattered in several positions. Because a black density around difference dada constituting the high frequency noise is low, the difference dada constituting the high frequency noise is not kept at an original black gray level "0" and increases to a first gray level equal to or greater than a middle gray level. On the other hand, because a black density around difference dada corresponding to the touch boundary line in an area "C" is high, the difference dada corresponding to the touch boundary line is kept at a second gray level close to the original black gray level "0". The second gray level is less than the first gray level.

Subsequently, as shown in FIG. 8, the difference data going through the filtering operation is second binarized using a predetermined second threshold value TH2 as a parameter in step 60. The second threshold value TH2 is used to remove the difference dada constituting the high frequency noise and may be properly set depending on the generation frequency number and the size of high frequency noise determined based on an external illuminance or a screen shape. The second threshold value TH2 has a gray level between the first gray level and the second gray level. For example, the second threshold value TH2 may be properly set within a gray level range corresponding to approximately 30% to 50% of the peak white gray level. In FIG. 8, the second threshold value TH2 was set to a gray level of 120 in consideration of a maximum gray level of 255. After going through the second binary processing, the difference data less than the second threshold value TH2 is reset to the black gray level "0", and the difference data greater than the second threshold value TH2 is reset to the peak white gray level "$2^k$". As a result, the difference data constituting the high frequency noise changes to the peak white gray level, and thus the high frequency noise is completely removed.

Subsequently, as shown in FIG. 9, corrected light sensing data, in which the high frequency noise is completely removed through the second binary processing, is output in step S70. As can be seen from FIG. 9, the corrected light sensing data has the black gray level in only the touch boundary line and has the peak white gray level in a background portion in which the noise existed.

Figure 10:
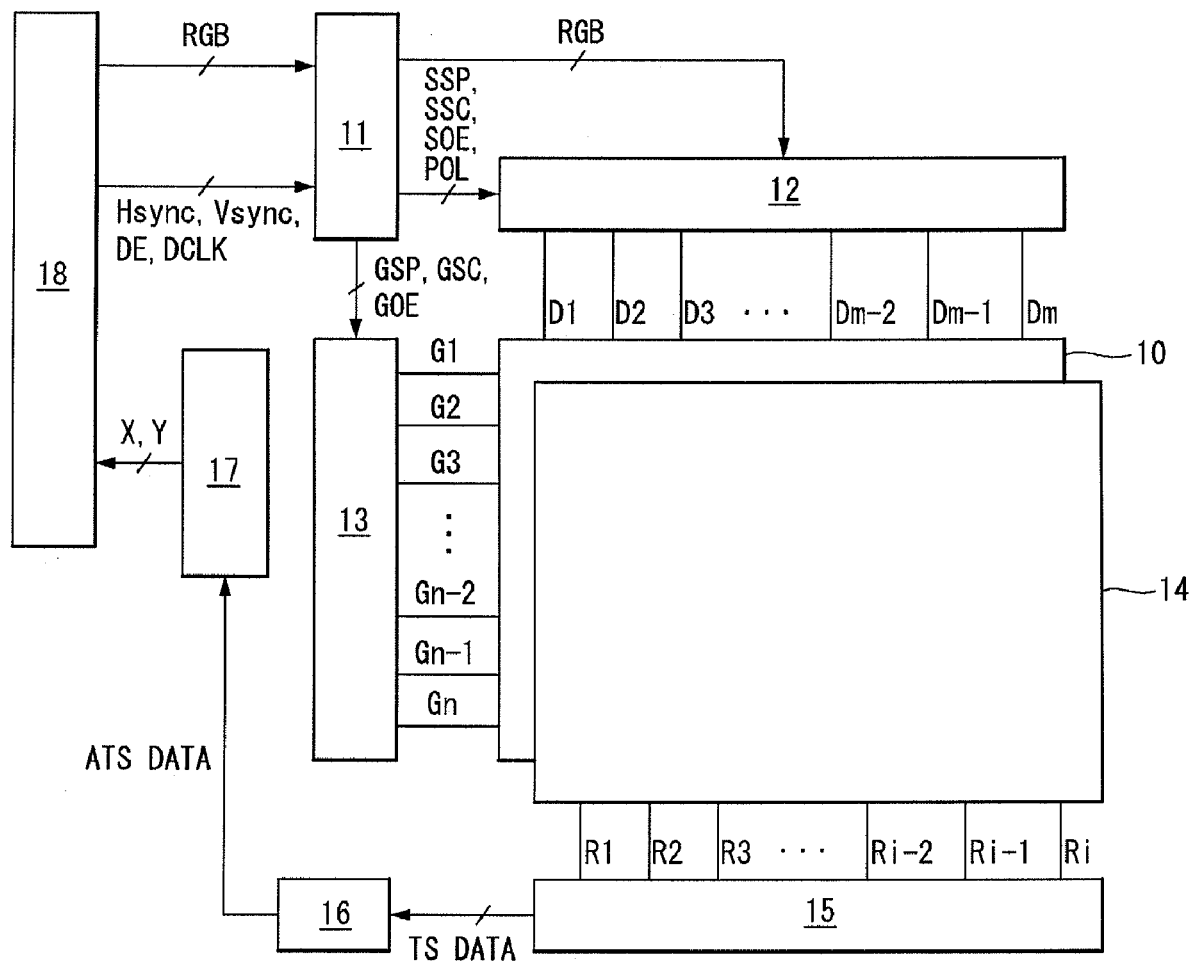
FIG. 10 is a block diagram illustrating a flat panel display according to an embodiment of the disclosure.

FIG. 10 is a block diagram illustrating a flat panel display according to an embodiment of the invention.

As shown in FIG. 10, a flat panel display according to an embodiment of the invention includes a display device, a touch information processing device, and a system 18.

The display device includes a display panel 10, a timing controller 11, a data drive circuit 12, and a scan drive circuit 13. The display device may be implemented as a flat panel display such as a liquid crystal display (LCD), a field emission display (FED), a plasma display panel (PDP), and an organic light emitting diode (OLED) display. In the embodiment, the liquid crystal display will be described as the display device.

Figure 14:
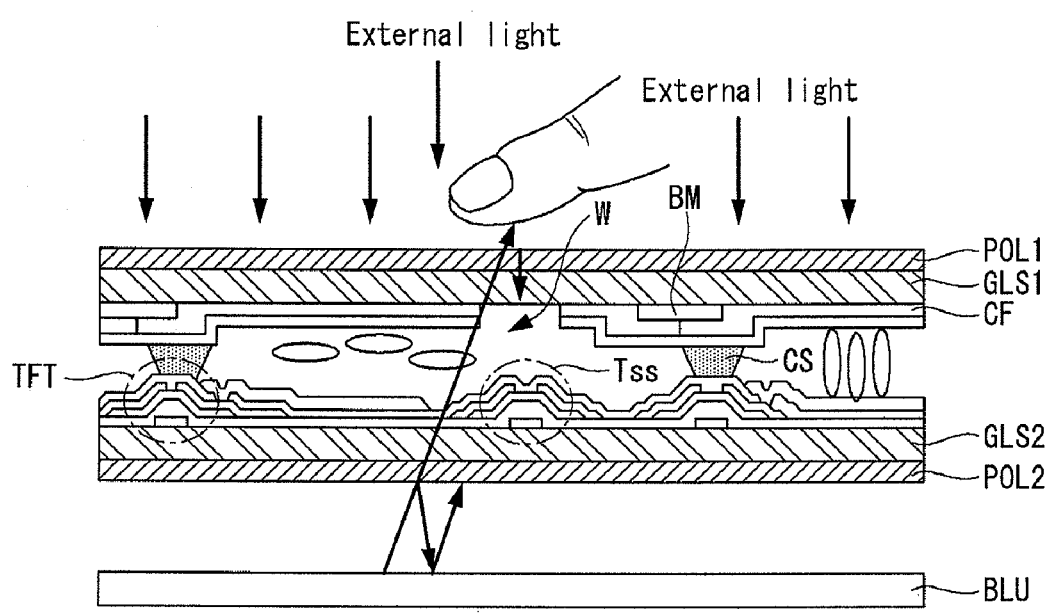
FIG. 14 is a cross-sectional view illustrating an exemplary structure of touch sensors mounted inside a pixel array of a display panel.

As shown in FIG. 14, the liquid crystal display may further include a backlight unit BLU providing light to the display panel 10. The backlight unit BLU may be implemented as an edge type backlight unit, in which light sources are positioned opposite the side of a light guide plate, or a direct type backlight unit, in which light sources are positioned under a diffusion plate.

The display panel 10 includes an upper glass substrate GLS1, a lower glass substrate GLS2, and a liquid crystal layer between the upper and lower glass substrates GLS1 and GLS2. The lower glass substrate GLS2 of the display panel 10, as shown in FIGS. 10 and 13 to 15, includes a plurality of data lines D1 to Dm, a plurality of gate lines G1 to Gn crossing the data lines D1 to Dm, a plurality of thin film transistors (TFTs), each of which is formed at each of crossings of the data lines D1 to Dm and the gate lines G1 to Gn, a plurality of pixel electrodes 1 for charging liquid crystal cells Clc to a data voltage, a storage capacitor Cst that is connected to the pixel electrodes 1 and keeps a voltage of the liquid crystal cells Clc constant, and the like. The liquid crystal cells Clc are arranged in a matrix format through a crossing structure of the data lines D1 to Dm and the gate lines G1 to Gn.

The upper glass substrate GLS1 of the display panel 10 includes a black matrix BM, a color filter CF, a common electrode 2, and the like. The common electrode 2 is formed on the upper glass substrate GLS1 in a vertical electric drive manner, such as a twisted nematic (TN) mode and a vertical alignment (VA) mode. The common electrode 2 and the pixel electrode 1 are formed on the lower glass substrate GLS2 in a horizontal electric drive manner, such as an in-plane switching (IPS) mode and a fringe field switching (FFS) mode. Polarizing plates POL1 and POL2 are respectively attached to the upper and lower glass substrates GLS1 and GLS2. Alignment layers for setting a pre-tilt angle of liquid crystals in an interface contacting the liquid crystals are respectively formed on the upper and lower glass substrates GLS1 and GLS2. A column spacer CS may be formed between the upper and lower glass substrates GLS1 and GLS2 to keep cell gaps of the liquid crystal cells Clc constant.

The timing controller 11 receives timing signals, such as a vertical sync signal Vsync, a horizontal sync signal Hsync, a data enable signal DE, and a dot clock DCLK from the system 18 to generate control signals for controlling operation timing of each of the data drive circuit 12 and the scan drive circuit 13. A control signal for controlling the operation timing of the scan drive circuit 13 includes a gate start pulse GSP, a gate shift clock GSC, a gate output enable signal GOE, and the like. A control signal for controlling the operation timing of the data drive circuit 12 includes a source start pulse SSP, a source sampling clock SSC, a source output enable signal SOE, a polarity control signal POL, and the like. The timing controller 11 controls the data drive circuit 12 and the scan drive circuit 13 and also may generate a control signal for controlling input/output operation timing of the touch information processing device to control the touch information processing device. The timing controller 11 rearranges digital video data RGB received from the system 18 in conformity with a resolution of the display panel 10 to supply the digital video data RGB to the data drive circuit 12.

The data drive circuit 12 includes a plurality of source drive integrated circuits (ICs). The data drive circuit 12 latches the digital video data RGB under the control of the timing controller 11 and converts the digital video data RGB into analog positive/negative gamma compensation voltage to generate an analog positive/negative pixel voltage. The data drive circuit 12 supplies the analog positive/negative pixel voltage to the data lines D1 to Dm.

The scan drive circuit 13 includes at least one scan drive IC. The scan drive circuit 13 sequentially supplies a scan pulse (or a gate pulse) to the gate lines G1 to Gn.

The touch information processing device includes a touch sensor array 14, a readout IC 15, a touch information processing circuit 16, and a touch position detecting circuit 17.

The touch sensor array 14 includes a plurality of touch sensors connected to readout lines R1 to Ri. The touch sensor array 14 may be stacked on the display panel 10 of the display device, may be inserted inside the display panel 10, or may be formed inside a pixel array of the display panel 10 so that the touch sensor array 14 and the display panel 10 form an integral body.

The readout IC 15 supplies a driving voltage to the touch sensors of the touch sensor array 14 and converts a light current output from the touch sensors through the readout lines R1 to Ri into light sensing data TS DATA.

The touch information processing circuit 16 receives the light sensing data TS DATA from the readout IC 15, individually stores the light sensing data TS DATA corresponding to each frame, and generates difference data using a difference between adjacent light sensing frame data. Afterwards, the touch information processing circuit 16 removes a high frequency noise included in the difference data through a first binary operation using a first threshold value, a filtering operation using Gaussian kernel, and a second binary operation using a second threshold value to thereby generate a corrected light sensing data ATS DATA.

The touch position detecting circuit 17 performs a vector operation algorism to detect touch coordinates (X, Y) from the corrected light sensing data ATS DATA. The touch position detecting circuit 17 generally detects a position of the uppermost black data among the corrected light sensing data ATS DATA as the touch coordinates (X, Y) using an upward priority manner.

The system 18 converts analog video data received from the outside into the digital video data RGB to supply the digital video data RGB to the timing controller 11. The system 18 extracts a composite video signal using video data, generates the timing signals Hsync, Vsync, DE, and DCLK suitable for the resolution of the display panel 10 using the extracted composite video signal, and supplies the timing signals Hsync, Vsync, DE, and DCLK to the timing controller 11. In particular, the system 18 applies the touch coordinates (X,Y) received from the touch information processing device to a touch recognition algorism and again reflects an application result in the display device.

Figure 11:
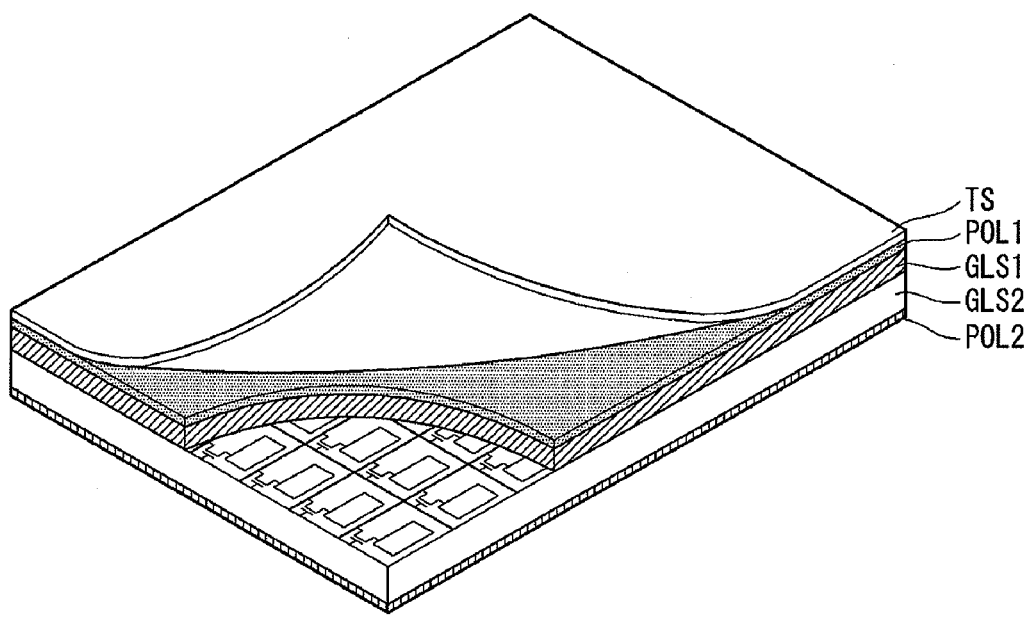
FIGS. 11 to 13 illustrate various exemplary configurations between a touch sensor array and a display panel.
Figure 12:
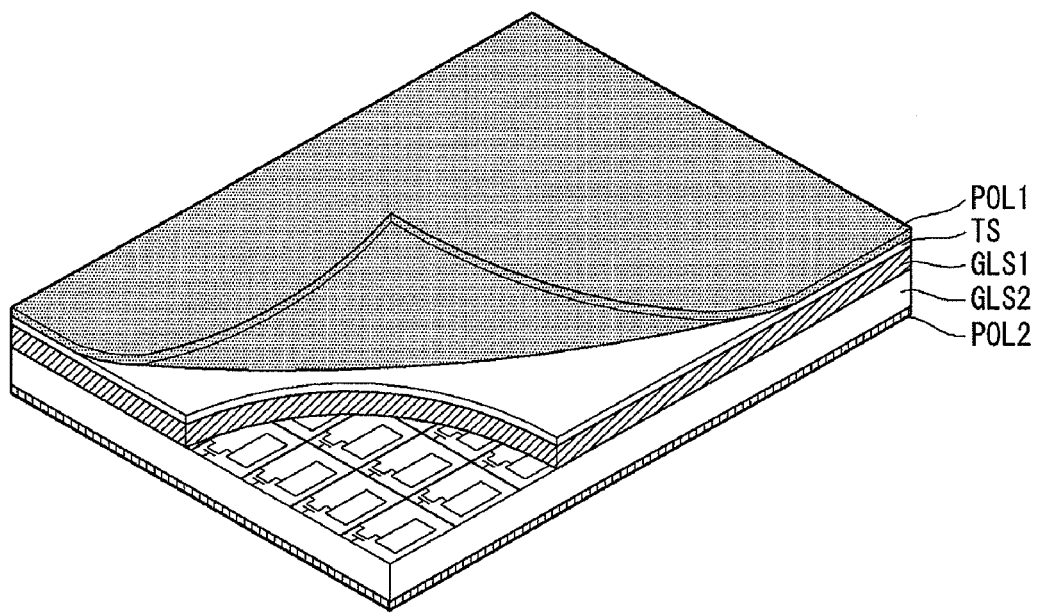
Figure 13:
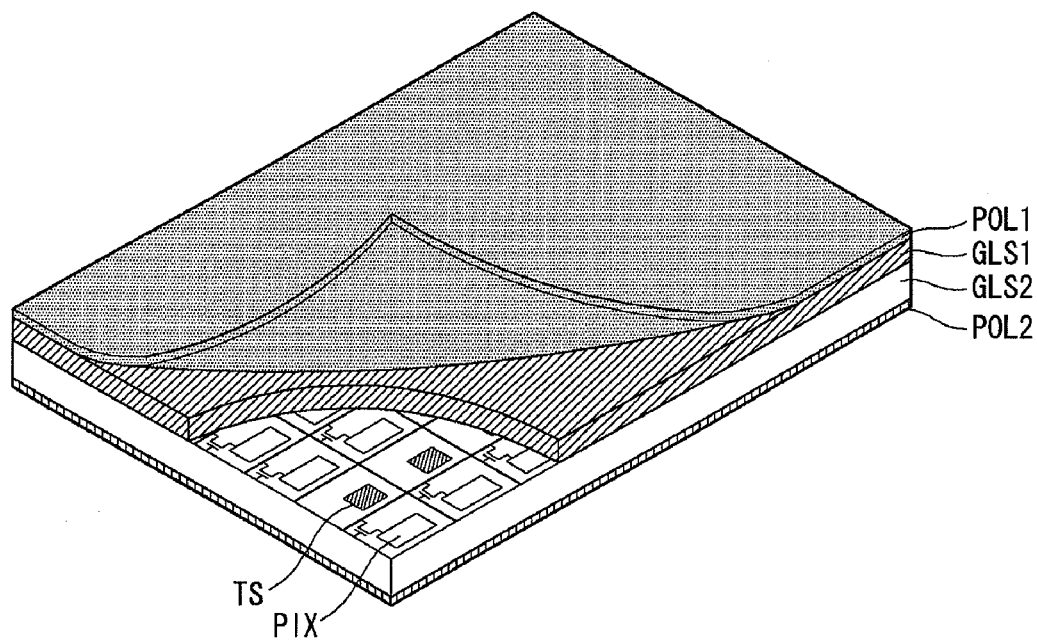

FIGS. 11 to 13 illustrate various exemplary configurations between the touch sensor array 14 and the display panel 10.

As shown in FIG. 11, the touch sensor array 14 may include a touch sensor TS stacked on the upper polarizing plate POL1 of the display panel 10. As shown in FIG. 12, the touch sensor array 14 may be mounted inside the display panel 10 and may include a touch sensor TS interposed between the upper polarizing plate POL1 and the upper glass substrate GLS1. The touch sensor array 14 shown in FIGS. 11 and 12 may be implemented as one of a resistance layer type touch sensor, a capacitance type touch sensor, a surface acoustic wave (SAW) type touch sensor, and an infrared type touch sensor.

As shown in FIG. 13, the touch sensor array 14 may include a plurality of touch sensors TS formed inside the pixel array of the display panel 10. The pixel array of the display panel 10 is formed on the lower glass substrate GLS2 and includes the data lines D1 to Dm, the gate lines G1 to Gn, pixel switching TFTs, the storage capacitor Cst, the pixel electrodes 1, and the like. Each of the touch sensors TS shown in FIG. 13 may include a TFT and a capacitor for detecting a sensor voltage. The TFT of the touch sensor TS and the pixel switching TFTs of the pixel array are simultaneously formed, and the capacitor of the touch sensor TS and the storage capacitor Cst are simultaneously formed.

Figure 15:
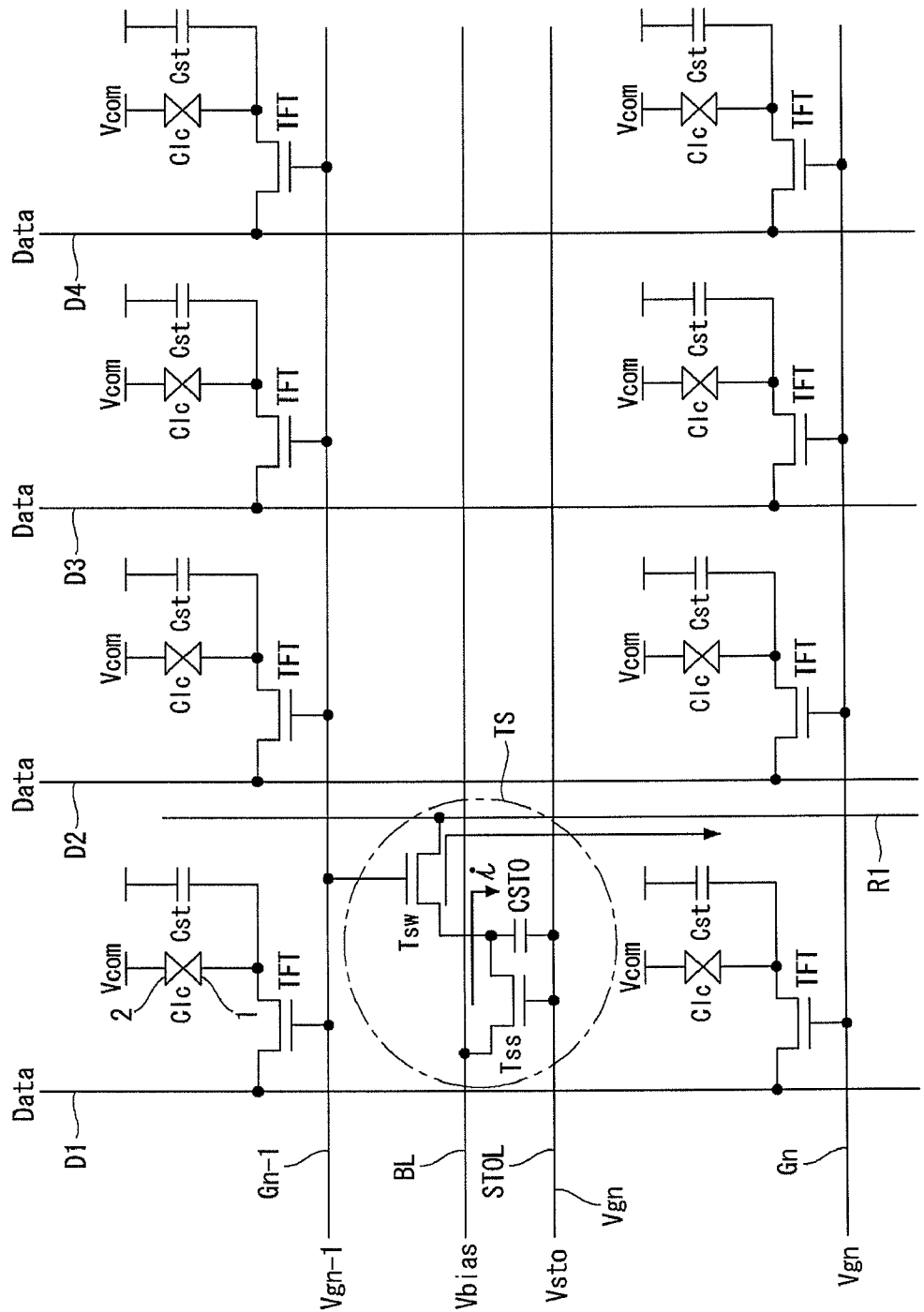
FIG. 15 is an equivalent circuit diagram illustrating an exemplary structure of touch sensors mounted inside a pixel array of a display panel.

FIG. 14 is a cross-sectional view illustrating an exemplary structure of the touch sensors mounted inside the pixel array of the display panel 10. FIG. 15 is an equivalent circuit diagram illustrating an exemplary structure of the touch sensors mounted inside the pixel array of the display panel 10. The touch sensors mounted inside the pixel array are not limited to examples illustrated in FIGS. 14 and 15 and may be embodied in many different forms.

As shown in FIGS. 14 and 15, each of the touch sensors TS may include a sensor TFT Tss, a storage capacitor CSTO, and a switching TFT Tsw.

The sensor TFT Tss opposes a transparent window W of the upper glass substrate GLS1. The black matrix BM is not formed on the transparent window W. In the sensor TFT Tss, a gate electrode is connected to a storage reference voltage line STOL and one terminal of the storage capacitor CSTO, a drain electrode is connected to a bias voltage supply line BL receiving a bias voltage Vbias, and a source electrode is connected to the other terminal of the storage capacitor CSTO and a drain electrode of the switching TFT Tsw via a first node n1. If a touch object such as a user's finger or a stylus pen is placed on the upper glass substrate GLS1 opposite the sensor TFT Tss, light from the backlight unit BLU is transmitted by the lower glass substrate GLS2, the liquid crystal layer, and the upper glass substrate GLS1. Then, the light is reflected from the touch object and is incident on a semiconductor layer of the sensor TFT Tss. The sensor TFT Tss differently generates a light current "i" depending on an amount of light incident on the semiconductor layer of the sensor TFT Tss.

While the switching TFT Tsw remains in an off-state, the storage capacitor CSTO is charged to the light current "i" generated by the sensor TFT Tss. Then, when the switching TFT Tsw is turned on, the light current "i" of the storage capacitor CSTO is discharged.

The switching TFT Tsw opposes the black matrix BM of the upper glass substrate GLS1, so that light is not irradiated to the switching TFT Tsw. The switching TFT Tsw is turned on in response to the scan pulse from the gate lines G1 to Gn. The switching TFT Tsw supplies a voltage discharged by the storage capacitor CSTO to the readout lines R1 to Ri. In the switching TFT Tsw, a gate electrode is connected to the gate lines G1 to Gn, a drain electrode is connected to the source electrode of the sensor TFT Tss and the other terminal of the storage capacitor CSTO via the first node n1, and a source electrode is connected to the readout lines R1 to Ri.

Figure 16:
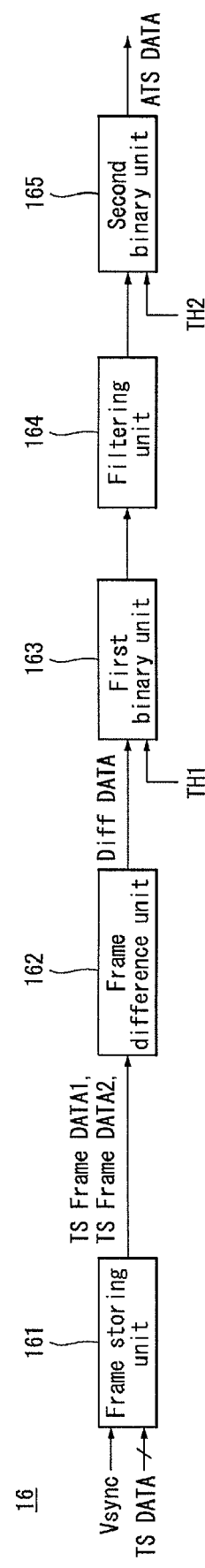
FIG. 16 is a block diagram illustrating a touch information processing circuit.

FIG. 16 is a block diagram illustrating in detail the touch information processing circuit 16.

As shown in FIG. 16, the touch information processing circuit 16 includes a frame storing unit 161, a frame difference unit 162, a first binary unit 163, a filtering unit 164, and a second binary unit 165.

The frame storing unit 161 includes two frame memories. The frame storing unit 161 receives the light sensing data TS DATA from the readout IC 15 and individually stores the light sensing data TS DATA corresponding to each frame.

The frame difference unit 162 includes a subtracting unit for comparing and subtracting light sensing data TS DATA input in frames. More specifically, the frame difference unit 162 subtracts second light sensing frame data TS Frame DATA2 input in a previous frame (for example, an (N−1)-th frame) from first light sensing frame data TS Frame DATA1 input in a current frame (for example, an N-th frame) to generate difference data Diff DATA.

The first binary unit 163 first binarizes the difference data Diff DATA using a predetermined first threshold value TH1 as a parameter.

The filtering unit 164 filters the first binarized difference data Diff DATA in horizontal and vertical directions (i.e., transverse and longitudinal directions) using Gaussian kernel. As a result, gray levels of the difference data Diff DATA around the touch boundary line can be distinguished from gray levels of the difference data Diff DATA around the high frequency noise. Because a black density around the difference data Diff DATA constituting the high frequency noise is low, the difference data Diff DATA constituting the high frequency noise is not kept at an original black gray level "0" and increases to a gray level equal to or greater than a middle gray level. On the other hand, because a black density around the difference data Diff DATA corresponding to the touch boundary line is high, the difference data Diff DATA corresponding to the touch boundary line is kept at a gray level close to the original black gray level "0".

The second binary unit 165 second binarizes the filtered difference data Diff DATA using a predetermined second threshold value TH2 as a parameter to thereby generate a corrected light sensing data ATS DATA. Hence, the difference data Diff DATA less than the second threshold value TH2 is reset to the black gray level, and the difference data Diff DATA greater than the second threshold value TH2 is reset to the peak white gray level. As a result, the difference data Diff DATA constituting the high frequency noise changes to the peak white gray level, and thus the high frequency noise is completely removed.

As described above, in the touch information processing method, the touch information processing device, and the flat panel display using the same according to the embodiment of the invention, the high frequency noise included in the difference data generated using the frame difference method can be completely removed by correcting the difference data through the first binary operation using the first threshold value, the filtering operation using Gaussian kernel, and the second binary operation using the second threshold value.

Furthermore, in the touch information processing method, the touch information processing device, and the flat panel display using the same according to the embodiment of the invention, because the high frequency noise can be completely removed using not a physical or hardware method but a simple image processing technology, an excellent effect can be obtained in the cost and the size of a circuit design.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch information processing method comprising:
    generating sensor output data from a touch sensor array including a plurality of touch sensors;
    individually storing the sensor output data in a frame unit and computing the sensor output data corresponding to adjacent frames to generate difference data;
    first binarizing the difference data based on a previously determined first threshold value to generate the difference data corresponding to a black gray level and the difference data corresponding to a white gray level;
    filtering the first binarized difference data to vary a gray level of the difference data corresponding to the black gray level depending on a black density around the difference data corresponding to the black gray level; and
    second binarizing the filtered difference data based on a previously determined second threshold value to generate the difference data corresponding to the black gray level and the difference data corresponding to the white gray level,
    wherein the filtering of the first binarized difference data uses Gaussian kernel expressed by the following Equation:

$$K = \frac{1}{\sqrt{2\pi\sigma}} \exp\left(-\frac{x^2}{2\sigma^2}\right).$$

2. The touch information processing method of claim 1, wherein the filtering of the first binarized difference data comprises:
    changing a gray level of the difference data having a relatively low black density among the difference data corresponding to the black gray level to a first gray level greater than the black gray level; and
    changing a gray level of the difference data having a relatively high black density among the difference data corresponding to the black gray level to a second gray level that is greater than the black gray level and is less than the first gray level.

3. The touch information processing method of claim 2, wherein the second threshold value has a gray level between the first gray level and the second gray level.

4. A touch information processing device comprising:
    a touch sensor array including a plurality of touch sensors;
    a frame difference unit that obtains sensor output data from the touch sensor array in a frame unit and computes the sensor output data corresponding to adjacent frames to generate difference data;
    a first binary unit that first binarizes the difference data based on a previously determined first threshold value to generate the difference data corresponding to a black gray level and the difference data corresponding to a white gray level;
    a filtering unit that filters the first binarized difference data to vary a gray level of the difference data corresponding to the black gray level depending on a black density around the difference data corresponding to the black gray level; and
    a second binary unit that second binarizes the filtered difference data based on a previously determined second threshold value to generate the difference data corresponding to the black gray level and the difference data corresponding to the white gray level,
    wherein the filtering unit filters the first binarized difference data using Gaussian kernel expressed by the following Equation:

$$K = \frac{1}{\sqrt{2\pi\sigma}} \exp\left(-\frac{x^2}{2\sigma^2}\right).$$

5. The touch information processing device of claim 4, wherein the filtering unit changes a gray level of the difference data having a relatively low black density among the difference data corresponding to the black gray level to a first gray level greater than the black gray level, wherein the filtering unit changes a gray level of the difference data having a relatively high black density among the difference data corresponding to the black gray level to a second gray level that is greater than the black gray level and is less than the first gray level.

6. The touch information processing device of claim 5, wherein the second threshold value has a gray level between the first gray level and the second gray level.

7. A flat panel display comprising:
a display device including a display panel, a data drive circuit driving data lines of the display panel, a scan drive circuit driving gate lines of the display panel, and a timing controller controlling operation timing of each of the data drive circuit and the scan drive circuit; and
a touch information processing device including:
a touch sensor array including a plurality of touch sensors;
a frame difference unit that obtains sensor output data from the touch sensor array in a frame unit and computes the sensor output data corresponding to adjacent frames to generate difference data;
a first binary unit that first binarizes the difference data based on a previously determined first threshold value to generate the difference data corresponding to a black gray level and the difference data corresponding to a white gray level;
a filtering unit that filters the first binarized difference data to vary a gray level of the difference data corresponding to the black gray level depending on a black density around the difference data corresponding to the black gray level; and
a second binary unit that second binarizes the filtered difference data based on a previously determined second threshold value to generate the difference data corresponding to the black gray level and the difference data corresponding to the white gray level, wherein the filtering unit filters the first binarized difference data using Gaussian kernel expressed by the following Equation:

$$K = \frac{1}{\sqrt{2\pi}\sigma} \exp\left(-\frac{x^2}{2\sigma^2}\right).$$

8. The flat panel display of claim 7, wherein the filtering unit changes a gray level of the difference data having a relatively low black density among the difference data corresponding to the black gray level to a first gray level greater than the black gray level, wherein the filtering unit changes a gray level of the difference data having a relatively high black density among the difference data corresponding to the black gray level to a second gray level that is greater than the black gray level and is less than the first gray level.

9. The flat panel display of claim 8, wherein the second threshold value has a gray level between the first gray level and the second gray level.

10. The flat panel display of claim 7, wherein the plurality of touch sensors are formed inside a pixel array of the display panel.

11. The flat panel display of claim 7, wherein the plurality of touch sensors are positioned on an upper polarizing plate of the display panel or are interposed between the upper polarizing plate of the display panel and an upper glass substrate of the display panel.

12. The flat panel display of claim 7, wherein the plurality of touch sensors are interposed between the upper polarizing plate of the display panel and an upper glass substrate of the display panel.

* * * * *